_(12)_ United States Patent
Sato et al.

(10) Patent No.: US 6,340,150 B1
(45) Date of Patent: Jan. 22, 2002

(54) FLOWRATE CONTROL VALVE FOR POWDER AND GRANULAR MATERIAL

(75) Inventors: Satoshi Sato; Hiroki Nomoto, both of Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/601,649

(22) PCT Filed: Oct. 19, 1998

(86) PCT No.: PCT/JP98/04728

§ 371 Date: Aug. 4, 2000

§ 102(e) Date: Aug. 4, 2000

(87) PCT Pub. No.: WO00/23733

PCT Pub. Date: Apr. 27, 2000

(51) Int. Cl.[7] .................................................. F16K 1/20
(52) U.S. Cl. .......................................................... 251/298
(58) Field of Search ................................ 251/298, 299, 251/300, 301

(56) References Cited

U.S. PATENT DOCUMENTS

| 373,773 A | * | 11/1887 | Griesser ................. 251/298 X |
| 508,307 A | * | 11/1893 | Haagen ................... 251/300 X |
| 4,489,862 A | | 12/1984 | Diem .......................... 222/263 |
| 4,512,703 A | * | 4/1985 | Lepley ................... 251/299 X |
| 5,257,647 A | * | 11/1993 | Wilhite ................... 251/299 X |
| 5,305,985 A | * | 4/1994 | Fendley et al. ......... 251/298 X |

FOREIGN PATENT DOCUMENTS

| JP | 56-13389 | 9/1981 |
| JP | 57-141320 | 9/1982 |
| JP | 58-31824 | 2/1983 |
| JP | 61-26281 | 6/1986 |
| JP | 1-91794 | 6/1989 |
| JP | 6-40576 | 2/1994 |
| JP | 7-223698 | 8/1995 |

* cited by examiner

Primary Examiner—Kevin Shaver
Assistant Examiner—John Bastianelli

(57) ABSTRACT

An edge plate 11 of prescribed height is provided around three sides except a free end side of a swinging plate 5 that can close the lower end of an ore fines inlet pipe 2 which is tilted at a prescribed angle. By the edge plate 11 of prescribed height, when the swinging plate 5 is opened, the ore fines are allowed to flow out only from the free end side of the swinging plate 5 provided that the opening height is held within the height of the edge plate 11, and an accurate flow control of ore fines can thus be achieved.

2 Claims, 4 Drawing Sheets

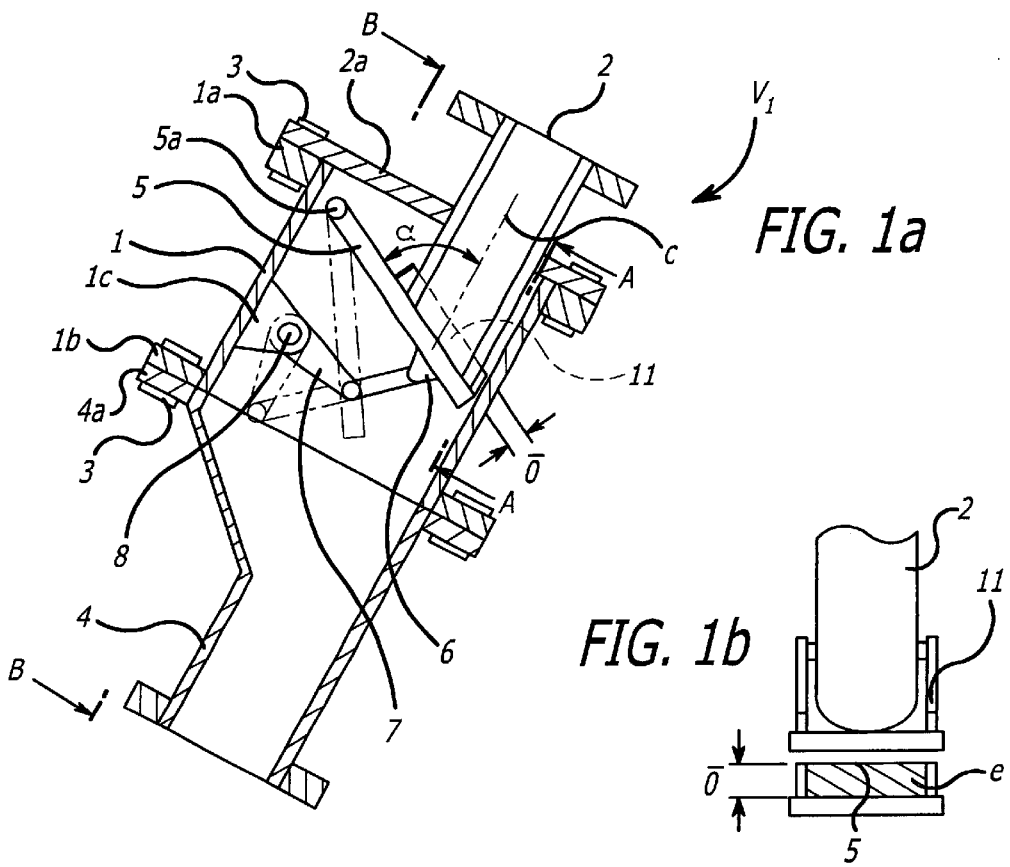
FIG. 1a
FIG. 1b
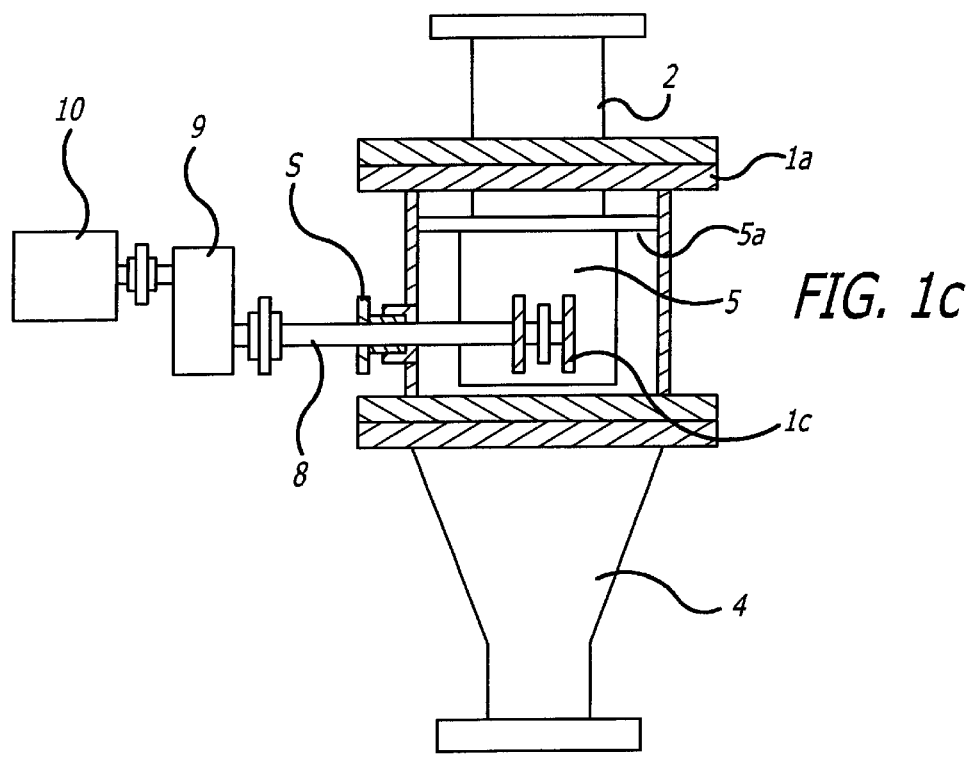
FIG. 1c

FLOWRATE CONTROL VALVE FOR POWDER AND GRANULAR MATERIAL

TECHNICAL FIELD

The present invention relates to a flow control valve for controlling a flow rate of ore fines flowing from an upper part to a lower part of a pipe line.

BACKGROUND ART

Conventionally, when transferring the ore fines of iron carbide, cement clinker, coal, iron ore or the like, it has often been practiced to control the flow rate of ore fines during transferring.

One known example of such a flow control valve for ore fines is a valve 50 rn such as shown in the longitudinally sectional view of FIG. 5. However, since this valve 50 operates by just opening and closing a swinging plate 51, it is not possible to stably and accurately control the quantity of ore fines because the ore fines flow from an inlet pipe 52 through not only the lower end of the swinging plate 51 but also the side edges of the plate, and the valve 50 is therefore not suitable for use as a flow control valve for accurately controlling the flow rate.

Another known example of such a flow control valve for ore fines is a rotary valve 60 such as shown in the longitudinally sectional view of FIG. 6. However, since this valve 60 has a rotor 61 which is rotating at all times, the ceaseless rotation accelerates the wear of rotating parts and shortens the lifetime. Furthermore, in case of controlling the flow rate, the rotational speed of the rotor 61 must be controlled in a variable manner, which increases the equipment cost.

To resolve these problems, the applicant of the present invention has previously filed a patent application for an invention which is disclosed in Japanese unexamined Patent Application No. 7-223698. A valve 70 for ore fines disclosed in the above patent application comprises, as shown in the longitudinally sectional view of FIG. 7, a casing 71 and a rotatable valve body 72 built into the casing 71, in which the casing 71 has a sideway inlet opening 73 continuing from a pipe installed thereon and a downward outlet opening 74 communicating with the inlet opening 73, and the valve body 72 is comprised of a first opening 75 connected in slidably rotatable fashion to the inlet opening 73 and a second opening 76 communicating with the first opening 75 so as to face the outlet opening 74.

By rotating the valve body 72 using driving means, the ore fines positioned at the inlet opening 73 is allowed to flow through the first opening 75 to the outlet opening 74 via the second opening 76, the rotation angle of the valve body 72 being controlled so that a prescribed quantity of ore fines can be discharged.

However, since the valve 70 for ore fines is designed to discharge a controlled quantity of ore fines by applying the angle of repose of the ore fines, the maximum attainable flow rate is small for the diameter of the inlet pipe, requiring a larger size valve for the required quantity of discharge. Furthermore, the structure of the valve becomes complex. Increased valve size and complex structure lead to an increase in valve cost. There is also the possibility that the ore fines may enter between sliding faces.

DISCLOSURE OF INVENTION

To resolve the above problem, according to the present invention, there is provided a flow control valve for ore fines comprising an ore fines inlet pipe whose lower end is cut at a prescribed angle and a swinging plate installed in swingable fashion to control the flow rate of ore fines by controlling the opening degree between the swinging plate and the lower end of the ore fines inlet pipe, wherein the ore fines inlet pipe is installed with its axis center tilted at an angle greater than the angle of repose of the ore fines, the swinging plate, when it keeps contact with the lower end of the ore fines inlet pipe, makes an acute angle with the axis center of the ore fines inlet pipe and the swinging plate is supported at an upper end thereof so that the support portion is positioned above the lower end opening of the ore fines inlet pipe, and an edge plate of prescribed height is provided around three sides except a free end side of the surface of the swinging plate which closes the lower end of the ore fines inlet pipe.

As described above, since the axis center of the ore fines inlet pipe is tilted at an angle greater than the angle of repose of the ore fines, the flow of ore fines can be stabilized at a slower velocity than would be in the case if the axis center were held in vertical position, and further, since the edge plate of prescribed height is provided around the three sides except the free end side of the surface of the swinging plate which closes the lower end of the ore fines inlet pipe, when the swinging plate is opened, the ore fines are allowed to flow out only from the free end side of the swinging plate within the height of the edge plate. Accordingly, the flow rate of ore fines can be controlled by restricting the flowing section of ore fines within a predetermined rectangular section. Thus, since an accurate flow control can be achieved by just controlling the opening of the swinging plate, a cheap flow control valve for ore fines can be provided that is capable of performing stable flow control of ore fines.

Since the support portion, which is the swinging center of the swinging plate, is located above the lower end opening of the ore fines inlet pipe, no sliding portions are brought into contact with the ore fines and there is no possibility of the ore fines entering between sliding faces.

Furthermore, when means for opening and closing the swinging plate that closes the lower end of the ore fines inlet pipe is provided on the back surface of the swinging plate, the flow control of ore fines can be accomplished without bringing the means for opening and closing the swinging plate into contact with the ore fines. This can provide a flow control valve for ore fines in which the opening and closing means is prevented from wearing by keeping contact with the ore fines.

BRIEF DESCRIPTION OF DRAWINGS

FIG. 1 is view showing a first embodiment according to the present invention, FIG. 1(a) being a longitudinally sectional view, FIG. 1(b) being a view taken along the line A—A, and FIG. 1(c) being a view taken along the line B—B;

BEST MODE FOR CARRYING OUT THE INVENTION

Figure 2:
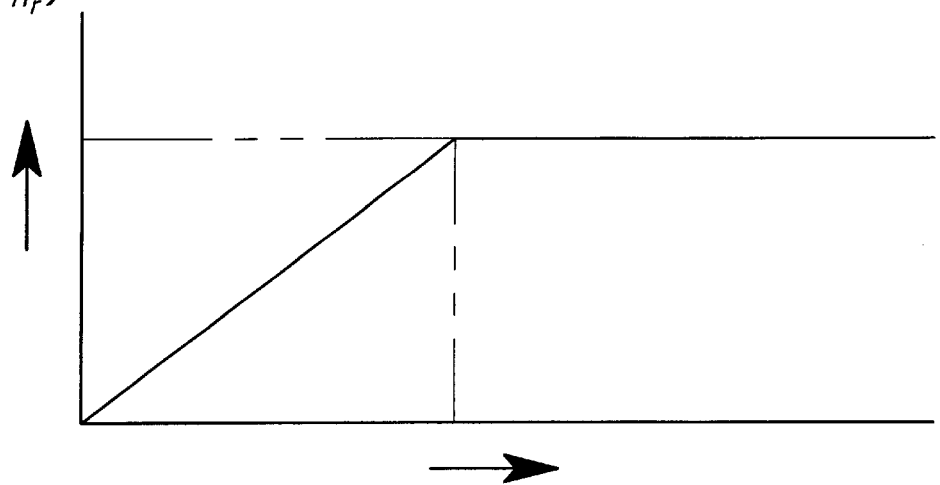
FIG. 2 is a graph showing the flow characteristic of the flow control valve for ore fines illustrated in FIG. 1.

A preferred embodiment of the present invention will be described below with reference to the drawings. FIG. 1 is a view showing a first embodiment according to the present invention, FIG. 1(a) being a longitudinally sectional view, FIG. 1(b) being a view taken along the line A—A, and FIG. 1(c) being a view taken along the line B—B.

As shown in FIG. 1, in this embodiment, an ore fines inlet pipe 2 with a flange 2a is installed on an upper part of a casing 1 whose cross section is rectangular, and the flange 2a is connected to an upper flange 1a of the casing 1 with bolt 3. To a lower flange 1b of the casing 1 is connected an ore fines outlet pipe 4 having a flange 4a at the upper end thereof, the flange 4a of the ore fines outlet pipe 4 being connected to the lower flange 1b of the casing 1 with bolt 3. The upper part of the ore fines outlet pipe 4 is rectangular, and the lower part thereof is circular.

The lower end of the ore fines inlet pipe 2 is cut to cross at a prescribed angle a to the axis center 'c' of the ore fines inlet pipe 2. In this embodiment, the crossed axes angle is about 60 degrees.

In this embodiment, a swinging plate 5, which keeps contact with the lower end of the ore fines inlet pipe 2, makes an acute angle with the axis center of the ore fines inlet pipe 2, and the swinging plate 5 is supported at its upper end with a shaft 5a rotatably attached to the casing 1 so that the support portion is positioned above the lower end opening of the ore fines inlet pipe 2. The other end, that is, the free end of the swinging plate 5 is thus made swingable about the shaft 5a.

As described above, the lower end of the ore fines inlet pipe 2 is cut at a prescribed angle, and the swinging plate 5 keeping contact with the lower end of the ore fines inlet pipe 2 has the free end side at the tip, allowing the ore fines contained in the ore fines inlet pipe 2 to always flow out from the free end side of the swinging plate 5.

A bracket 6 is attached to the back surface of the swinging plate 5, and a link member 7 is connected to the bracket 6. The link member 7 is driven by a drive motor 10 which is connected via a drive shaft 8, which is supported by a bracket 1c attached to the casing 1, and a reduction gears 9. By controlling the rotation angle of the drive motor 10, the swinging plate 5 can be opened up to a desired angle. In this embodiment, the drive motor 10 as a means for opening and closing the swinging plate 5 is installed on one side of the casing 1 to drive the link member 7 connected to the back surface of the swinging plate 5. Reference character 'S' designates a seal member for the drive shaft 8 installed on the casing 1.

An edge plate 11 of prescribed height is provided around three sides except the free end side of the surface of the swinging plate 5 which keeps contact with the ore fines inlet pipe 2. It is preferable that the height δ of the edge plate 11 would be determined in such a manner that, as shown in FIG. 1(b), the sectional area of the free end opening section 'e' defined by the swinging plate 5 and the edge plate 11 on both sides thereof becomes equal to or larger than the inner cross sectional area of the ore fines inlet pipe 2. That is, the construction is such as, during the process of opening the swinging plate 5, the height of the elongated rectangular opening section 'e' defined by the swinging plate 5 and the edge plate 11 on both sides thereof increases and, when the line joining the upper edges of the free end side of the edge plate 11 is going to leave the lower end of the ore fines inlet pipe 2, the sectional area of the opening section 'e' becomes equal to or larger than the inner cross sectional area of the ore fines inlet pipe 2. This is because the maximum flow rate of ore fines cannot exceed the flow rate determined by the inner cross sectional area of the ore fines inlet pipe 2 and also, after the sectional area of the opening section 'e' exceeds the inner cross sectional area of the ore fines inlet pipe 2, it is possible to measure the flow rate of ore fines even if the ore fines flow out over the edge plate 11 provided on the swinging plate 5. By setting the height δ of the edge plate 11 in this way, it can be performed to stably control the flow rate of ore fines flowing through the entire inner cross section of the ore fines inlet pipe 2.

This flow control valve for ore fines V1 is installed such as the entire construction is tilted at a prescribed angle greater than the angle of repose of the ore fines. In this embodiment, the valve V1 is held at a tilt angle of at about 60 degrees. This tilt ensures that the ore fines flow at a steady velocity. The tilt angle should be determined according to the kind of fines or the like.

According to the above flow control valve for ore fines V1 of the first embodiment, the drive motor 10 is driven to rotate the drive shaft 8 which in turn drives the link member 7 to open the swinging plate 5 up to the desired angle.

When the rotation is such as the opening height is smaller than the height of the edge plate 11, the flow of ore fines is restricted by the edge plate 11 attached to the swinging plate 5, allowing the ore fines contained in the ore fines inlet pipe 2 to flow only through the opening section 'e' at the free end side of the swinging plate 5, thus accomplishing an accurate flow control of ore fines. In this case, the relationship between the angle of opening of the swinging plate 5 and the flow rate of ore fines is substantially proportional as shown in the graph of FIG. 2 showing the flow characteristic, and the stable flow control of ore fines can thus be achieved.

Figure 3:
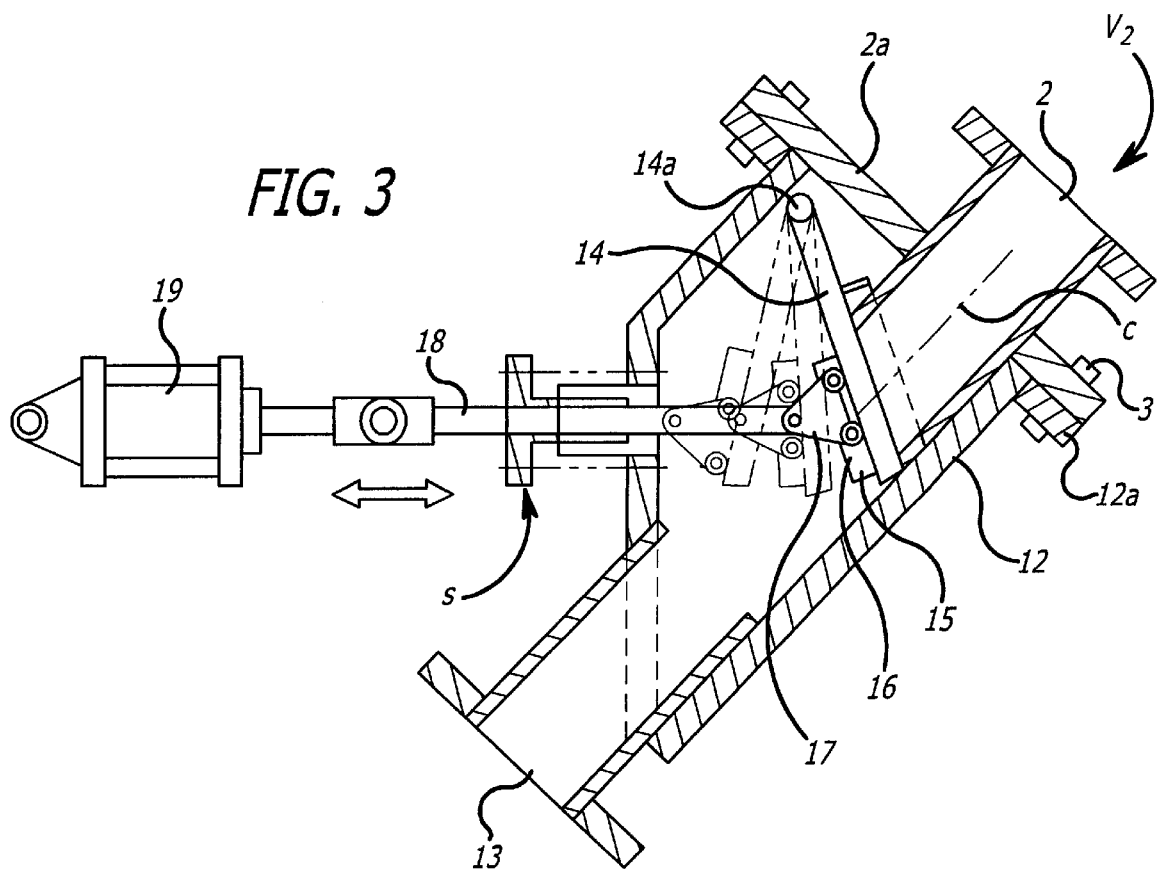
FIG. 3 is a longitudinally sectional view showing a second embodiment according to the present invention.

FIG. 3 is a longitudinally sectional view showing a second embodiment of the flow control valve for ore fines. The second embodiment uses a hydraulic cylinder as the driving means for opening and closing the swinging plate. The same parts as those in the foregoing first embodiment are designated by the same reference numerals, and explanatory descriptions of such parts will be omitted here.

As shown in FIG. 3, in the second embodiment also, the ore fines inlet pipe 2 with the flange 2a is installed on the upper part of a casing 12 whose cross section is rectangular, and the flange 2a is connected to an upper flange 12a of the casing 12 with bolt 3. In this embodiment, an ore fines outlet pipe 13 is directly fixed to the lower part of the casing 12. The lower end of the ore fines inlet pipe 2 is cut to cross at an angle of about 60 degree to the axis center 'c' similarly as in the foregoing first embodiment.

In this embodiment also, a swinging plate 14, which keeps contact with the lower end of the ore fines inlet pipe 2, makes an acute angle with the axis center of the ore fines inlet pipe 2, and the swinging plate 14 is supported at its upper end with a shaft 14a rotatably attached to the casing 12 so that the support portion is positioned above the lower end opening of the ore fines inlet pipe 2. The free end of the swinging plate 14 is thus made swingable about the shaft 14a.

This flow control valve for ore fines V2 is installed such as the entire construction is tilted at a prescribed angle greater than the angle of repose of the ore fines. In this embodiment, the valve V2 is held at a tilt angle of about 45 degrees.

The driving means for opening and closing the swinging plate 14 is attached to the back surface of the swinging plate 14. The driving means comprises a guide rail 15 of L-shaped section fixed to the swinging plate 14, a guide wheel 16 which moves while keeping contact with the swinging plate 14 by being guided along the L-shaped section of the guide rail 15, a triangular support member 17 which supports the guide wheel 16, an actuating shaft 18 whose one end is rotatably connected to the support member 17, and a hydraulic or pneumatic cylinder 19 which expands and contracts the actuating shaft 18. Reference character 'S' designates the seal member for the actuating shaft 18 installed on the casing 12.

Accordingly, by controlling the amount of expansion and contraction of the hydraulic or pneumatic cylinder 19, the swinging plate 14 can be opened up to the desired angle.

In this embodiment also, the lower end of the ore fines inlet pipe 2 is cut at a prescribed angle, and the swinging plate 14 keeping contact with the lower end of the ore fines inlet pipe has the free end side at the tip, allowing the ore fines contained in the ore fines inlet pipe 2 to always flow out from the free end side of the swinging plate 14. The edge plate 11 attached around the three sides except the free end side of the swinging plate 14 is the same as that disclosed in the foregoing first embodiment, and therefore, an explanatory description thereof will not be repeated here.

According to the flow control valve for ore fines V2 of the second embodiment, the hydraulic or pneumatic cylinder 19 is operated to expand or contract the actuating shaft 18, which causes the guide wheel 16 to move along the guide rail 15, thereby opening the swinging plate 14 up to the desired angle.

At this time, the position at which the guide wheel 16 keeps contact with the swinging plate 14 subjected to swing about its upper end, changes according to the angle of opening, but the guide wheel 16 can accommodate to the displacement since it is movable along the guide rail 15. The function of the edge plate 11 provided on the swinging plate 14 is the same as that described in the foregoing first embodiment, and therefore, an explanatory description thereof will not be repeated here.

Figure 4:
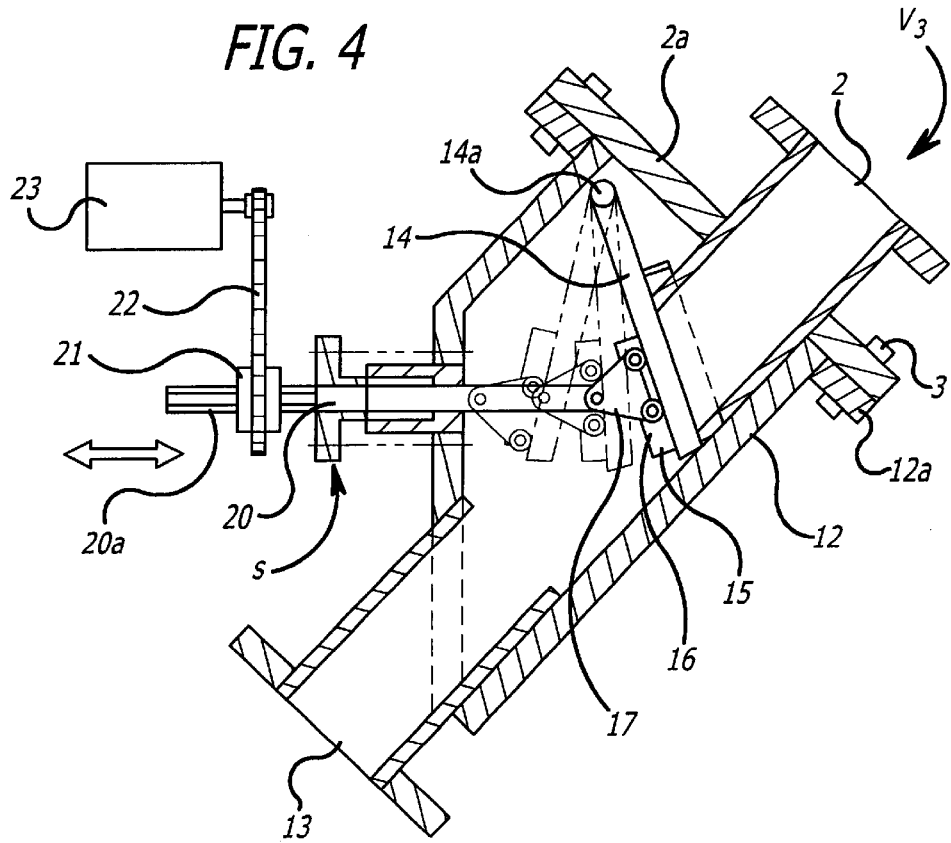
FIG. 4 is a longitudinally sectional view showing a third embodiment according to the present invention.
Figure 5:
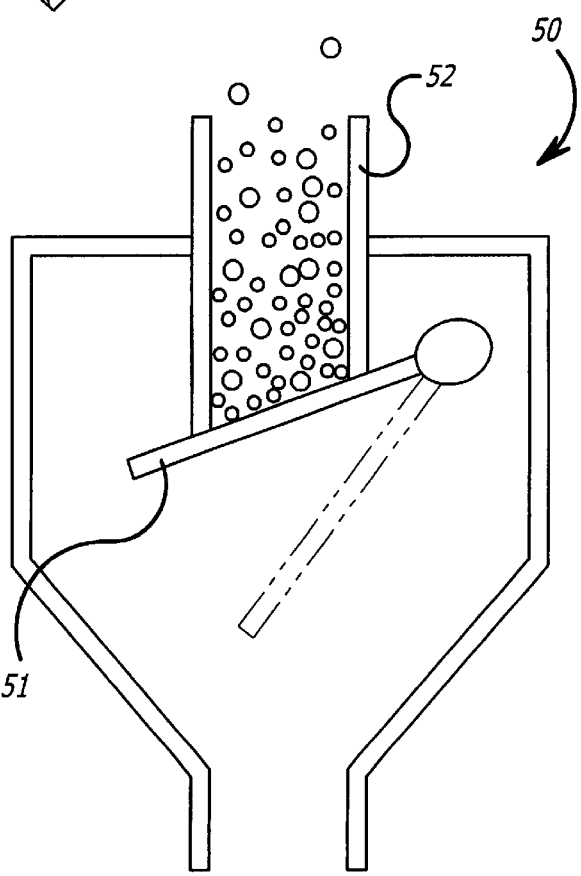
FIG. 5 is a longitudinally sectional view showing a flow control valve for ore fines according to the prior art;.
Figure 6:
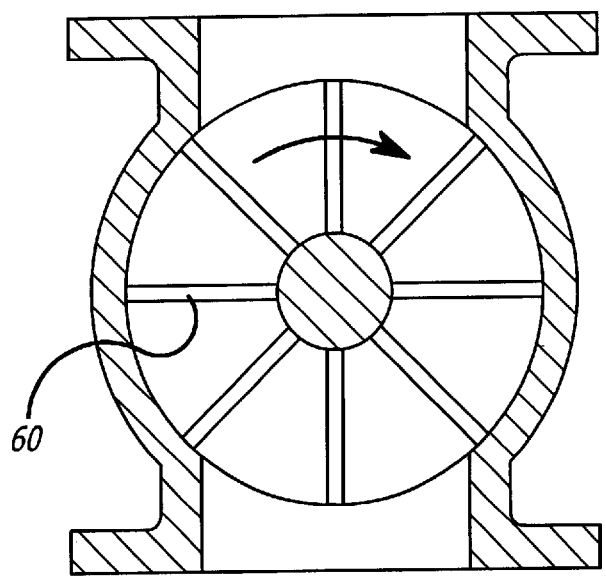
FIG. 6 is a longitudinally sectional view showing another flow control valve for ore fines according to the prior art;.
Figure 7:
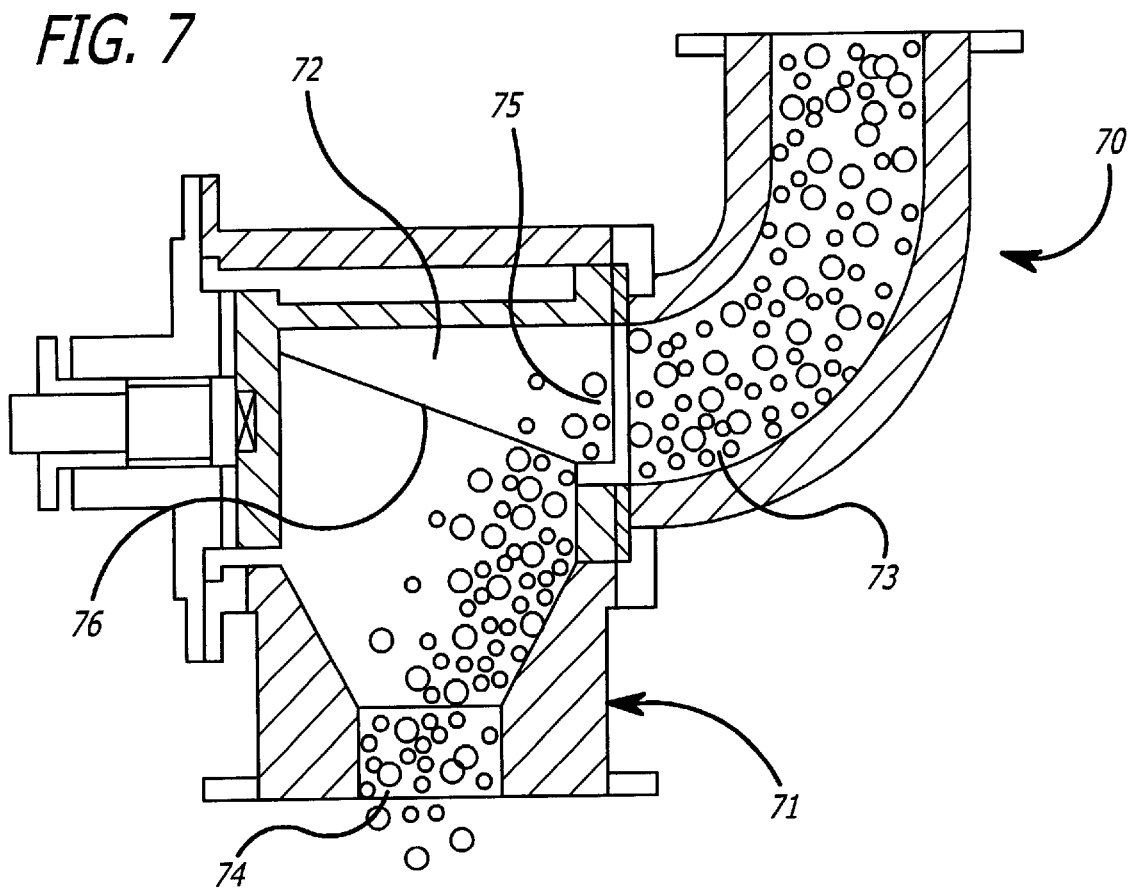
FIG. 7 is a longitudinally sectional view showing still another flow control valve for ore fines according to the prior art.

FIG. 4 is a longitudinally sectional view showing a third embodiment of the flow control valve for ore fines. The construction of the third embodiment is the same as that of the foregoing second embodiment, the only difference being in the driving means. In the third embodiment, a drive motor and a chain are used as the driving means for opening and closing the swinging plate. The same parts as those in the foregoing second embodiment are designated by the same reference numerals, and explanatory descriptions of such parts will be omitted here.

As shown in FIG. 4, in the third embodiment, the driving means for causing the swinging plate 14 to swing comprises an actuating shaft 20 whose one end is rotatably connected to the triangular support member 17 that supports the guide wheel 16 provided on the back surface of the swinging plate 14, a sprocket 21 which engages with a threaded portion 20a formed at the other end of the actuating shaft 20, a chain 22 for driving the sprocket 21, and a drive motor 23 for driving the chain 22. The sprocket 21 is supported by means of a support member not shown.

According to the flow control valve for ore fines V3 of the third embodiment, when the sprocket 21 is rotated by the chain 22 by driving the drive motor 23 in a controlled manner, the actuating shaft 20, whose threaded portion 20a is engaged with the rotating sprocket 21, is caused to move left or right in the FIG. 4, so that the swinging plate 14 can be opened up to the desired angle. In the third embodiment, similarly as in the first and second embodiments, since the edge plate 11 provided around the three sides except the free end side of the swinging plate 14 allows the ore fines contained in the ore fines inlet pipe 2 to flow out only from the free end side of the swinging plate 14, stable flow control of ore fines can be achieved.

The driving means for opening and closing the swinging plate 5 or 14 in the first to third embodiments is not limited to the illustrated examples, and other constructions such as one that opens and closes the swinging plate from one side of the casing 1 or 12 may be employed.

Furthermore, the tilt angle of the ore fines inlet pipe 2 described in the respective embodiments is not limited to the illustrated examples, but the tilt angle should be determined suitably and appropriately according to the kind of ore fines, temperature, pressure or the like.

INDUSTRIAL APPLICABILITY

The flow control valve for ore fines in accordance with the present invention is useful for controlling a flow rate of ore fines flowing from an upper part to a lower part of a pipe line. Especially, this flow control valve for ore fines is suitably used for controlling the flow rate of ore fines under a high temperature and a high pressure.

1 . . . casing, 2 . . . ore fines inlet pipe, 3 . . . bolt, 4 . . . ore fines outlet pipe, 5 . . . swinging plate, 6 . . . bracket, 7 . . . link member, 8 . . . drive shaft, 9 . . . reduction gears, 10 . . . drive motor, 11 . . . edge plate, 12 . . . casing, 13 . . . ore fines outlet pipe, 14 . . . swinging plate, 15 . . . guide rail, 16 . . . guide wheel, 17 . . . support member, 18 . . . actuating shaft, 19 . . . hydraulic or pneumatic cylinder, 20 . . . actuating shaft, 21 . . . sprocket, 22 . . . chain, 23 . . . drive motor, c . . . axis center, s . . . seal member, e . . . opening section, δ . . . height, $V_1$, $V_2$, $V_3$ . . . flow control valve for ore fines.

What is claimed is:

1. A flow control valve for ore fines comprising an ore fines inlet pipe whose lower end is cut at a prescribed angle and a swinging plate installed in swingable fashion to control the flow rate of ore fines by controlling the opening degree between the swinging plate and the lower end of the ore fines inlet pipe, wherein the ore fines inlet pipe is installed with its axis center tilted at an angle greater than the angle of repose of the ore fines, the swinging plate, when it keeps contact with the lower end of the ore fines inlet pipe, makes an acute angle with the axis center of the ore fines inlet pipe and the swinging plate is supported at an upper end thereof so that the support portion is positioned above the lower end opening of the ore fines inlet pipe, and an edge plate of prescribed height is provided around three sides except a free end side of the surface of the swinging plate which closes the lower end of the ore fines inlet pipe.

2. The flow control valve for ore fines of claim 1, wherein means for varying the opening degree of the swinging plate that can close the lower end of the ore fines inlet pipe is provided on the back surface of the swinging plate and is driven in such a manner as to control the swinging plate.

* * * * *